United States Patent [19]

Lu

[11] Patent Number: 5,734,769

[45] Date of Patent: Mar. 31, 1998

[54] OPTICAL FIBER FERRULE

[75] Inventor: Liang-Ju Lu, Eden Prarie, Minn.

[73] Assignee: ADC Telecommunications, Inc., Minneapolis, Minn.

[21] Appl. No.: 785,747

[22] Filed: Jan. 17, 1997

[51] Int. Cl.⁶ .................................................. G02B 6/38
[52] U.S. Cl. ............................ 385/61; 385/79; 385/85
[58] Field of Search ............................ 385/61, 34, 60, 385/67, 68, 78, 79, 84, 85

[56] References Cited

U.S. PATENT DOCUMENTS

| | | | |
|---|---|---|---|
| 4,978,193 | 12/1990 | Tomita | 385/55 |
| 5,140,660 | 8/1992 | Takahashi | 385/79 |
| 5,351,327 | 9/1994 | Lurie et al. | 385/78 |
| 5,432,880 | 7/1995 | Diner | 385/85 |
| 5,458,528 | 10/1995 | Lurie et al. | 451/41 |
| 5,459,806 | 10/1995 | Hultermans | 385/85 |
| 5,461,689 | 10/1995 | Matsuoka et al. | 385/85 |
| 5,463,709 | 10/1995 | Terao et al. | 385/78 |

OTHER PUBLICATIONS

Pitassi, S. et al., "High Performance Connectors with Cylindrical Ceramic Ferrule and Non–Polished Fiber End Face", *National Fiber Optic Engineers Conference*, Boston, Massachusetts, pp. 659–670 (Jun. 18–22, 1995).

Goduco, M. et al., "Hand–Held Polishing Machine for Connector Performance Enhancement", *National Fiber Optic Engineers Conference*, Boston, Massachusetts, pp. 671–678 (Jun. 18–22, 1995).

Stojanac, V., "Back Reflection in CATV Systems", *Fiberoptic Applications*, pp. 39–40 (Feb. 1991).

Shintaku, T. et al., "Highly Stable Physical–Contact Optical Fiber Connectors with Spherical Convex Ends", *Journal of Lightwave Technology*, vol. 11, No. 2, pp. 241–248 (Feb. 1993).

Reith, L.A. et al., "Effects of Ferrule–Endface Geometry on Connector Intermatebility", *National Fiber Optic Engineers Conference*, pp. 635–658 (Jun. 18–22, 1995).

Diner, F. et al., "Design Parameters of Angled Physical Contact (APC) Connectors", *National Fiber Optic Engineers Conference*, pp. 241–258 (Jun. 12, 1994).

*Primary Examiner*—John Ngo
*Attorney, Agent, or Firm*—Merchant, Gould, Smith, Edell, Welter & Schmidt, P.A.

[57] ABSTRACT

An optical connector ferrule includes a ferrule body which is cylindrical and has a transition portion extending from a cylindrical body to a terminal end of the ferrule body. The terminal end is provided with an inclined convex end face defining a plane of inclination inclined relative to the bore axis. The transition portion has an outer surface shaped for the transition portion to have a circular cross section taken perpendicular to a center line extending orthogonal to the plane of inclination.

18 Claims, 14 Drawing Sheets

OPTICAL FIBER FERRULE

BACKGROUND OF THE INVENTION

1. Field of the Invention

This invention pertains to ferrules for optical fibers which can be used in optical fiber connectors in optical fiber communication circuits.

2. Description of the Prior Art

Optical fibers are widely used for transmitting video, data and other information in telecommunications networks. When optical fibers are being connected, specialized optical fiber connectors are used. Such connectors include cylindrical ceramic ferrules having an axially extending bore into which an optical fiber is placed. The connector devices align opposing ferrules in axial alignment with the end faces of the ferrules in face-to-face contact and, preferably, with the opposing optical fibers axially aligned and in face-to-face contact.

Performance requirements for optical connectors have become increasingly stringent. Presently, optical fiber connectors are evaluated for both return loss and insertion loss performance criteria.

Return loss performance criteria are achieved by angling an end face of the connectors to provide a so-called angled physical contact (APC) connector. Typically, the end face is angled at about 8° relative to a plane which is perpendicular to a longitudinal axis of the ferrule. While APC connectors can improve return loss performance, such connectors can have poor insertion loss performance because of the effect of the oblique end faces of two mated ferrules which can suffer a contact failure due to tolerances on ferrule tip geometry and connector housing dimensions.

To reduce insertion loss, APC connectors preferably have a spherical or other convex tip with an apex positioned precisely on the longitudinal axis. Examples of attempts at such are shown in U.S. Pat. No. 5,140,660. However, a centered apex is difficult to attain. Also, ferrules such as those in the '660 patent are difficult to clean and have other design problems as explained in U.S. Pat. No. 5,351,327 (col. 2, ln. 50). Prior art ferrules with desired angled physical contact have a geometry which inherently leads to offset apex geometry.

It is an object of the present invention to provide a ferrule geometry with enhanced apex centering.

SUMMARY OF THE INVENTION

According to a preferred embodiment of the present invention, an optical connector ferrule and a method of manufacturing the same is disclosed with a ferrule body includes a transition portion adjacent a terminal end of the body. An inclined convex end face is provided at the terminal end with the end face defining a plane of inclination inclined relative to a bore axis. The transition portion has an outer surface shaped for the transition portion to have a circular cross section taken perpendicular to a center line extending orthogonally to the plane of inclination. The center line of the transition portion intersects the bore axis at an apex of the end face.

DESCRIPTION OF PREFERRED EMBODIMENT

Before providing a detailed description of a preferred embodiment to the present invention, a more detailed description of the prior art will be made with reference to FIGS. 1–5 for the purpose of facilitating an understanding of the present invention.

In each of FIGS. 1–5, a terminal end of a fiber optic ferrule is shown. Elements similar to each of FIGS. 1–5 are numbered similarly with the addition of the subscripts 1–5, respectively, to differentiate between the elements of FIGS. 1–5.

In each of FIGS. 1–5, a ferrule $10_1$–$10_5$ is shown. The ferrules $10_1$–$10_5$ have cylindrical ceramic bodies $12_1$–$12_5$ having longitudinal axes $X_1$—$X_1$ through $X_5$—$X_5$. A bore $11_1$–$11_5$ extends axially through each of the ferrule bodies $12_1$–$12_5$ coaxially with the axes $X_1$—$X_1$ through $X_5$—$X_5$.

For improved return loss performance, each of the ferrules $10_1$–$10_5$ is provided with a terminal end $14_1$–$14_5$ which is ground at an angle. More particularly, each of the terminal ends $14_1$–$14_5$ defines an inclination plane $P_1$–$P_5$ which is set at an angle $\alpha_1$–$\alpha_5$ relative to a plane $N_1$–$N_5$ which is perpendicular to the longitudinal axes $X_1$—$X_1$ through $X_5$—$X_5$. Commonly, angles $\alpha_1$–$\alpha_5$ are about 8° but can be in the range of 2° to 20°.

Each of the ferrules $10_1$–$10_5$ includes a transition portion $16_1$–$16_5$ from the bodies $12_1$–$12_5$ to the terminal ends $14_1$–$14_5$.

Figure 1:
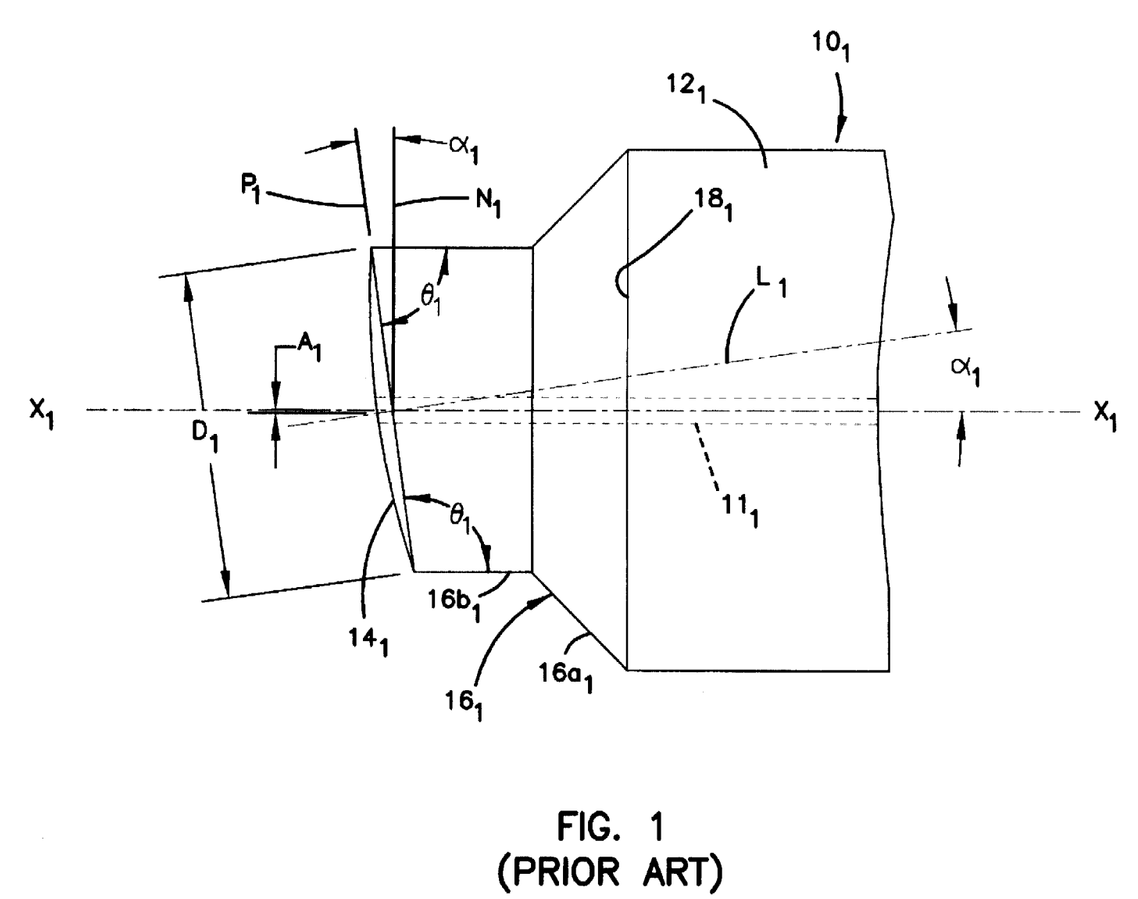
FIG. 1 is a side elevation view of a terminal end of a first embodiment of a ferrule body of the prior art.

In FIG. 1, the transition portion $16_1$ includes a frustrum (or frusto-conical portion) $16a_1$ and a reduced diameter (relative to body $12_1$) cylindrical portion $16b_1$. The frusto-conical portion $16a_1$ and the cylindrical portion $16b_1$ are both symmetrical about the longitudinal axis $X_1$—$X_1$. The embodiment of FIG. 1 is the same as that shown in FIG. 5 of U.S. Pat. No. 5,140,660.

Figure 2:
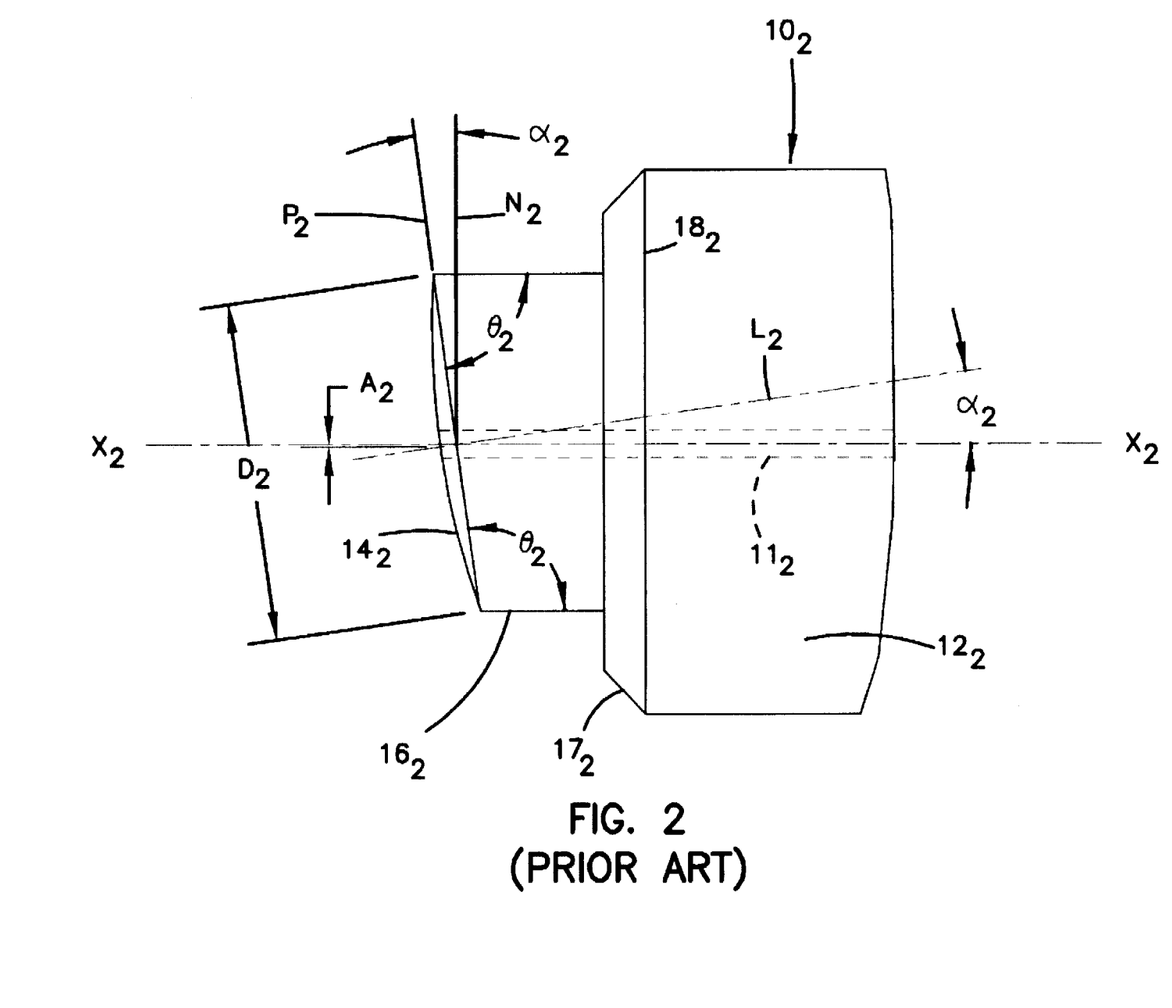
FIG. 2 is a view similar to FIG. 1 showing a second embodiment of the prior art.

In FIG. 2, the transition portion $16_2$ is a reduced diameter cylindrical which is symmetrical about longitudinal axis $X_2$—$X_2$. A small chamfer $17_2$ is provided on body $12_2$.

Figure 3:
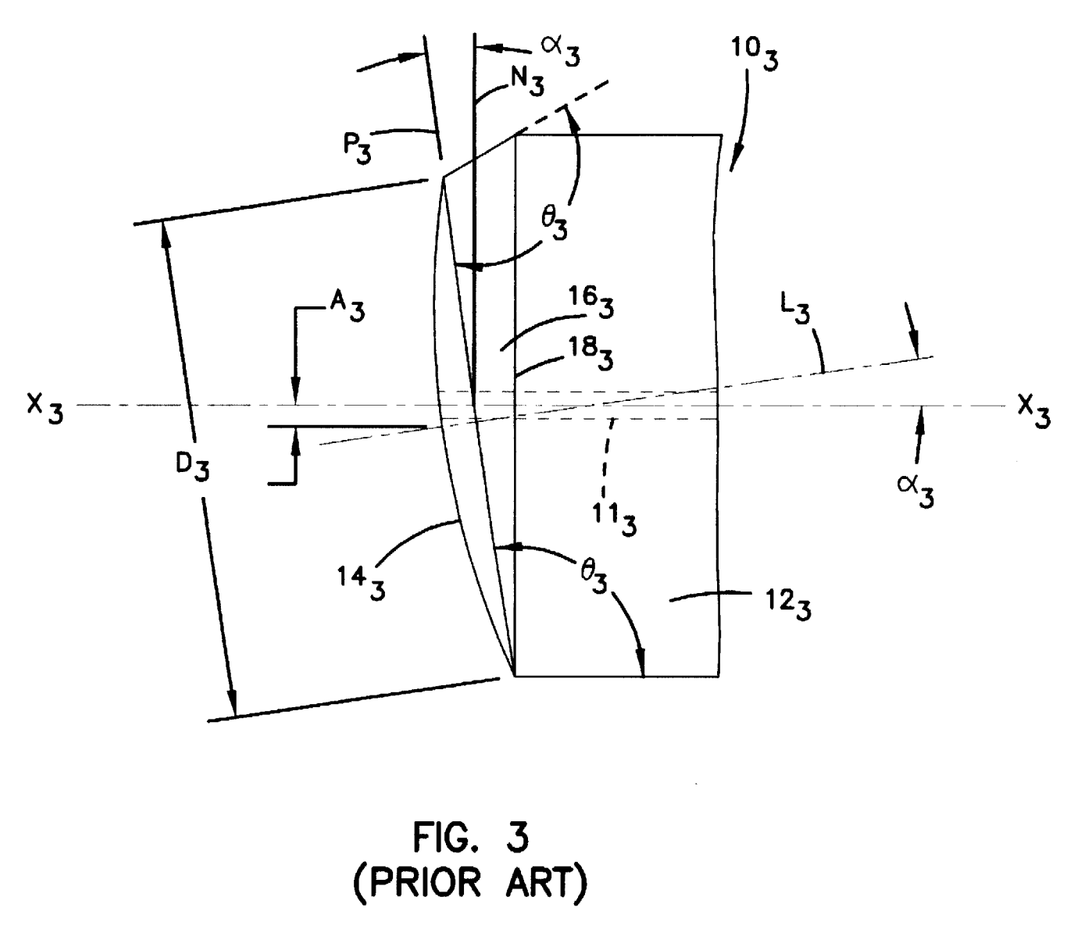
FIG. 3 is a view similar to that of FIGS. 1 and 2 showing a third embodiment of the prior art.
Figure 4:
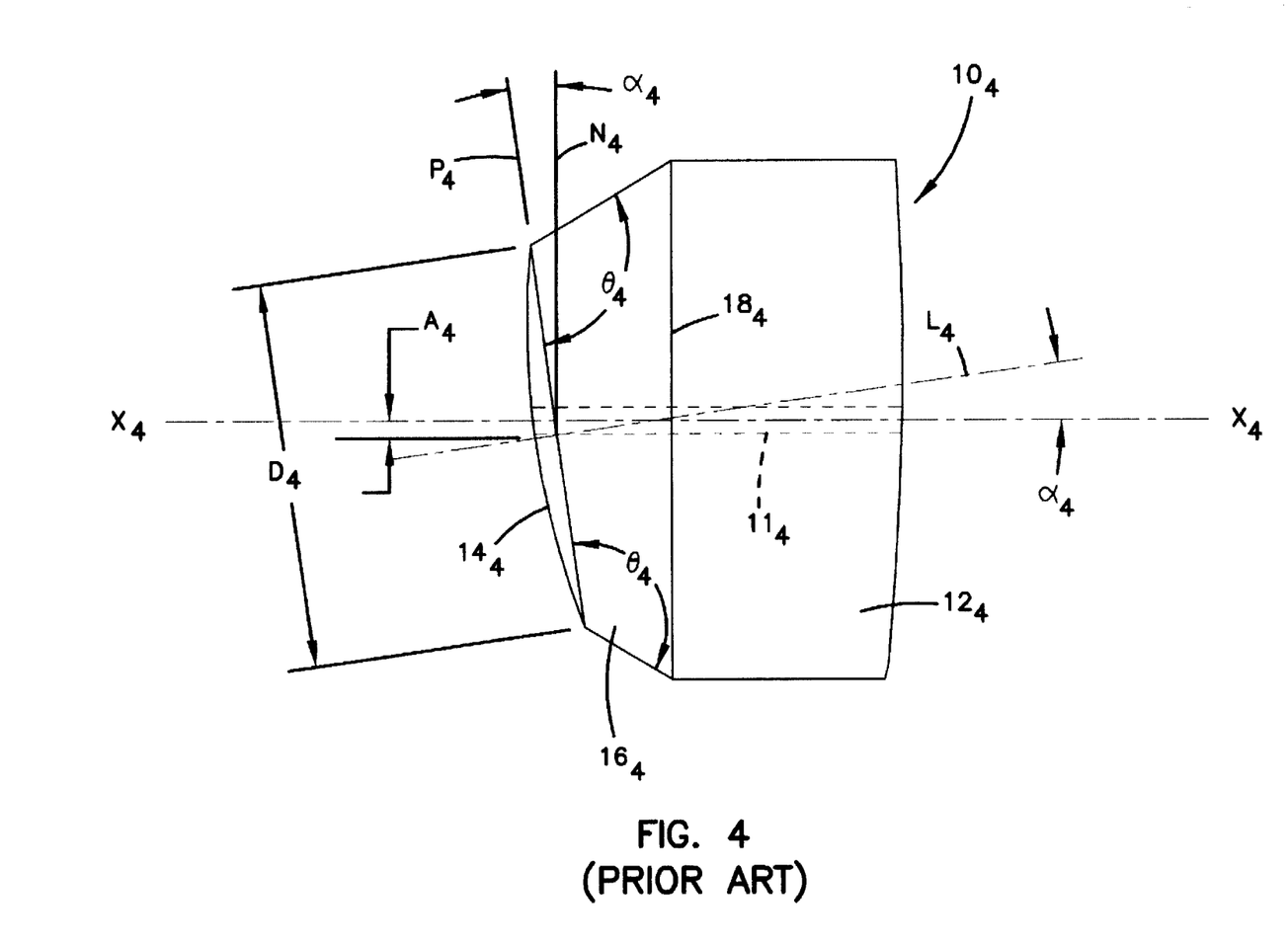
FIG. 4 is a view similar to that of FIGS. 1–3 showing a fourth embodiment of the prior art.
Figure 5:
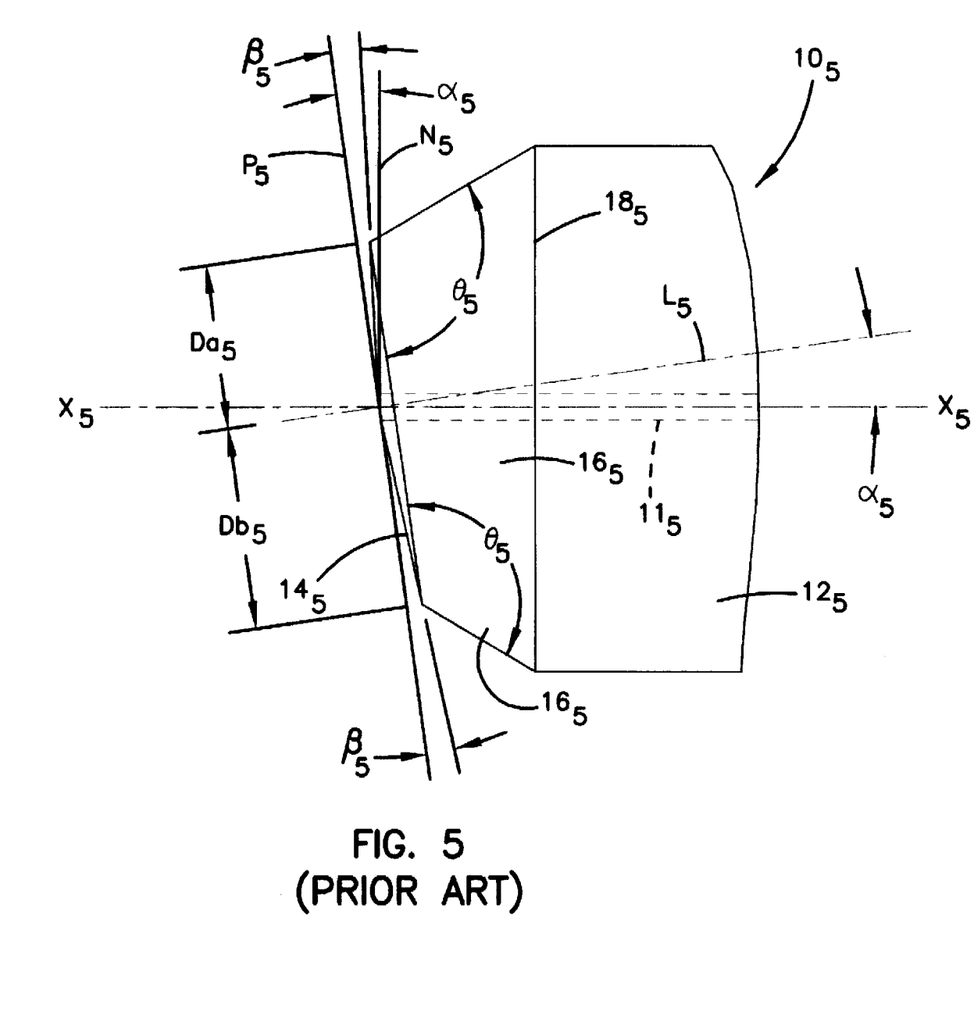
FIG. 5 is a view similar to FIGS. 1–4 showing a fifth embodiment of the prior art.

In FIGS. 3, 4 and 5, the transition portions $16_3$, $16_4$ and $16_5$ are frusto-conical portions symmetrical about the axes $X_3$—$X_3$ through $X_5$—$X_5$. In FIG. 3, the inclination plane $P_3$ is positioned such that the transition portion $16_3$ is a wedge.

In all of FIGS. 1-5, the terminal ends are convex. In FIGS. 1-4, the terminal ends $14_1$-$14_4$ are smooth and provided with a near-spherical polish. In FIG. 5, the end face $14_5$ is provided with a conical shape (illustrated by flat angled grinding $\beta_5$) such as that described in U.S. Pat. No. 5,463,709. While not shown in FIG. 5, the conical end face $14_5$ will be polished to have a spherical polish. Throughout this description of the prior art and the subsequent description of the preferred embodiment, "spherical" refers to a near-spherical polish of end faces of ferrules recognizing that true spherical polishing is not attained but only approximated.

In each of FIGS. 1-5, a line $L_1$-$L_5$ is drawn passing through the apex of the end faces $14_1$-$14_5$ and extending perpendicular to the planes $P_1$-$P_5$. It will be appreciated that lines $L_1$-$L_5$ define angles equal to $\alpha_1$-$\alpha_5$ with respect to the longitudinal axes $X_1$—$X_1$ through $X_5$—$X_5$. Also, in each of FIGS. 1-4, an apex offset $A_1$-$A_4$ is shown illustrating a separation between the apex and the axes for each of the embodiments of FIGS. 1-4. It will be appreciated that the apex refers to that point on the surface of FIGS. 1-4 where the tangent is generally parallel to the plane $P_1$-$P_4$. "Apex offset" is a displacement of the apex of curvature of the polished end $14_1$-$14_4$ relative to the fiber axes $X_1$—$X_1$ through $X_4$—$X_4$. With respect to FIG. 5, no apex offset is shown since FIG. 5 depicts end $14_5$ before a final spherical polish (which will result in an apex offset).

In FIGS. 1-4, the major diameters $D_1$-$D_4$ of the terminal ends $14_1$-$14_4$ (i.e., the largest transverse length since the terminal ends $14_1$-$14_5$ are ellipses instead of circles and therefore do not have uniform diameters) are shown. In FIG. 5, the major diameter is shown as unequal portions $Da_5$ and $Db_5$ separated by line $L_5$.

It is desirable that the apex offset $A_1$-$A_5$ be as small as possible and preferably about 50 microns or less. It is also desirable that the lines $L_1$-$L_5$ be centered on the terminal ends $14_1$-$14_5$ and intersect the fiber axes $X_1$—$X_1$ through $X_5$—$X_5$ at the apex. Unfortunately, each of the designs of FIGS. 1-5 inherently results in apex offset and non-centering of the apex.

It will be noted that with respect to each of FIGS. 1-5, the inclination planes $P_1$-$P_5$ intersect the transition areas $16_1$-$16_5$ to define an area of intersection having a geometry other than a circle. For example, in FIGS. 1 and 2, the inclination planes $P_1$ and $P_2$ intersect the transition areas $16b_1$ and $16_2$ at an angle $\alpha_1$, $\alpha_2$ other than an angle perpendicular to the cylindrical axes ($X_1$—$X_1$ and $X_2$—$X_2$) of the transition sections $16b_1$ and $16_2$. Accordingly, a non-circular area is defined by the intersection of the inclination planes $P_1$, $P_2$ and the transition sections $16b_1$, $16_2$. Similarly, since each of the transition sections $16_3$,$16_4$ and $16_5$ of FIGS. 3-5 is a cone which is symmetrical about the longitudinal axes ($X_3$—$X_3$ through $X_5$—$X_5$) of the ferrule bodies $12_3$-$12_5$, any inclination plane $P_3$-$P_5$ which passes through the transition areas $16_3$-$16_5$ at a non-perpendicular angle $\alpha_3$-$60_5$ to the longitudinal axes will define a non-circular area of intersection.

In the manufacture of the ferrules of FIGS. 1-5, the transition portions $16_1$-$16_5$ are first formed on a cylindrical ceramic ferrule. The inclination planes $P_1$-$P_5$ are then ground flat onto the terminal ends of the ferrules. (it will be appreciated that in both the prior art and in the present invention, the transition portions and inclination planes need not be formed by grinding. Instead, they can be formed through any suitable means including molding or casting.) Finally, the terminal ends $14_1$-$14_4$ are provided with the desired spherical shapes as in FIGS. 1-4 or with the conical shape $14_5$ as in FIG. 5 (which is then polished to the spherical shape). Therefore, a non-circular and flat terminal end is first ground before a final polishing is performed to shape the terminal end into the desired convex spherical shape.

The transition areas $16_1$-$16_5$ present an external surface which defines an angle $\theta_1$-$\theta_5$ with respect to the inclination planes $P_1$-$P_5$. This angle is referred to as a contact angle $\theta_1$-$\theta_5$ with respect to a polishing pad during final spherical polishing of the tips $14_1$-$14_4$.

In the figures, the contact angles $\theta_1$-$\theta_5$ are shown relative to a flat terminal end which exists prior to the final polishing of surfaces $14_1$-$14_5$. As such polishing continues, the surfaces $14_1$-$14_5$ evolve from a flat plane to a spherical polish. The contact angle $\theta_1$-$\theta_5$ is constantly varying during this process.

Since the fiber axes $X_1$—$X_1$ through $X_5$—$X_5$ are not perpendicular to the inclination planes $P_1$-$P_5$, the contact angles are not constant. Instead, the angle varies through the perimeter of the terminal ends $14_1$-$14_5$. For example, in the view of FIG. 1, the upper $\theta_1$ is a smaller value than the lower $\theta_1$.

The non-circular area formed when the flat terminal ends are ground along the planes of inclination $P_1$-$P_5$ precludes apex centering. Traditional polishing techniques include holding the ferrule at an angle relative to a polishing medium and rotating the polishing medium relative to the ferrule. An example of such an orientation is shown in FIG. 2 of U.S. Pat. No. 5,140,660.

If certain conditions are met, the tangential forces acting on the end face (i.e., the forces acting to polish the end face) are equal throughout the surface area of the end face. These conditions are: (1) a circular flat end face with a constant contact angle, (2) the axis of the circular end face is the axis of the revolved surface i.e., the transition portion 16) and is perpendicular to the polishing medium and (3) the axis of the circular end face intersects the fiber axis at the ferrule tip. However, a non-circular end face with varying contact angles and with inherent apex offset (such as that which results from the angled grinding of the embodiments of FIGS. 1-5) results in unequal tangential forces throughout the end face encouraging the apex of the end face to be formed off-center. The amount of the apex offset increases with the angle of inclination.

In addition to resulting in apex offset, the prior art has unnecessarily high resistance to insertion. For example, in each of FIGS. 1-5, the transition areas $16_1$-$16_5$ intersect the cylindrical bodies $12_1$-$12_5$ at perimeter lines $18_1$-$18_5$ which are perpendicular to the fiber axes $X_1$—$X_1$ through $X_5$—$X_5$. A perpendicular perimeter lines $18_1$-$18_5$ result in higher insertion forces than would a non-perpendicular perimeter line.

The present invention as will be described, pre-shapes the geometry of the transition area to insure that the subsequent polishing urges the apex to be formed on the fiber axis of the ferrule. Also, lower insertion forces are achieved.

Figure 6:
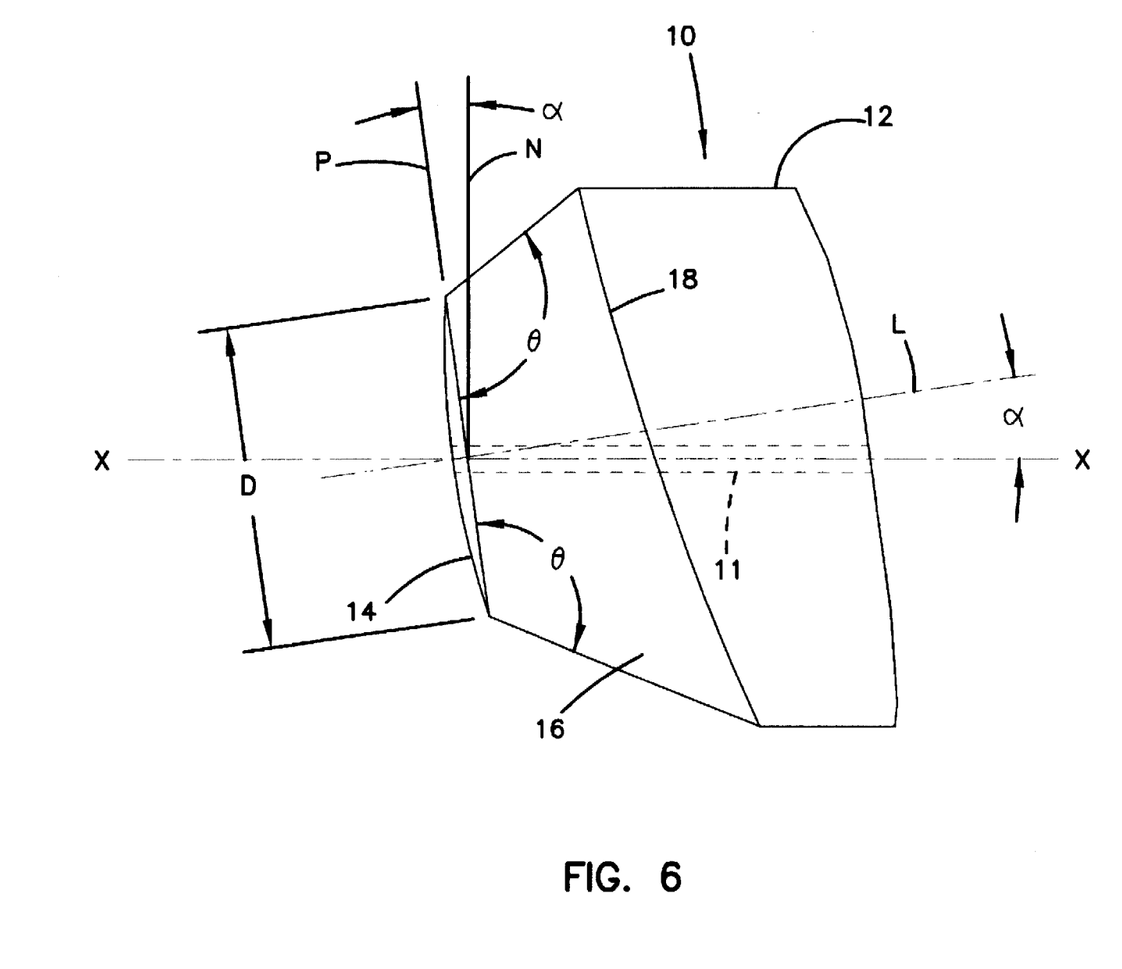
FIG. 6 is a view similar to FIGS. 1–5 showing a terminal end of a ferrule body according to the present invention.
Figure 6A:
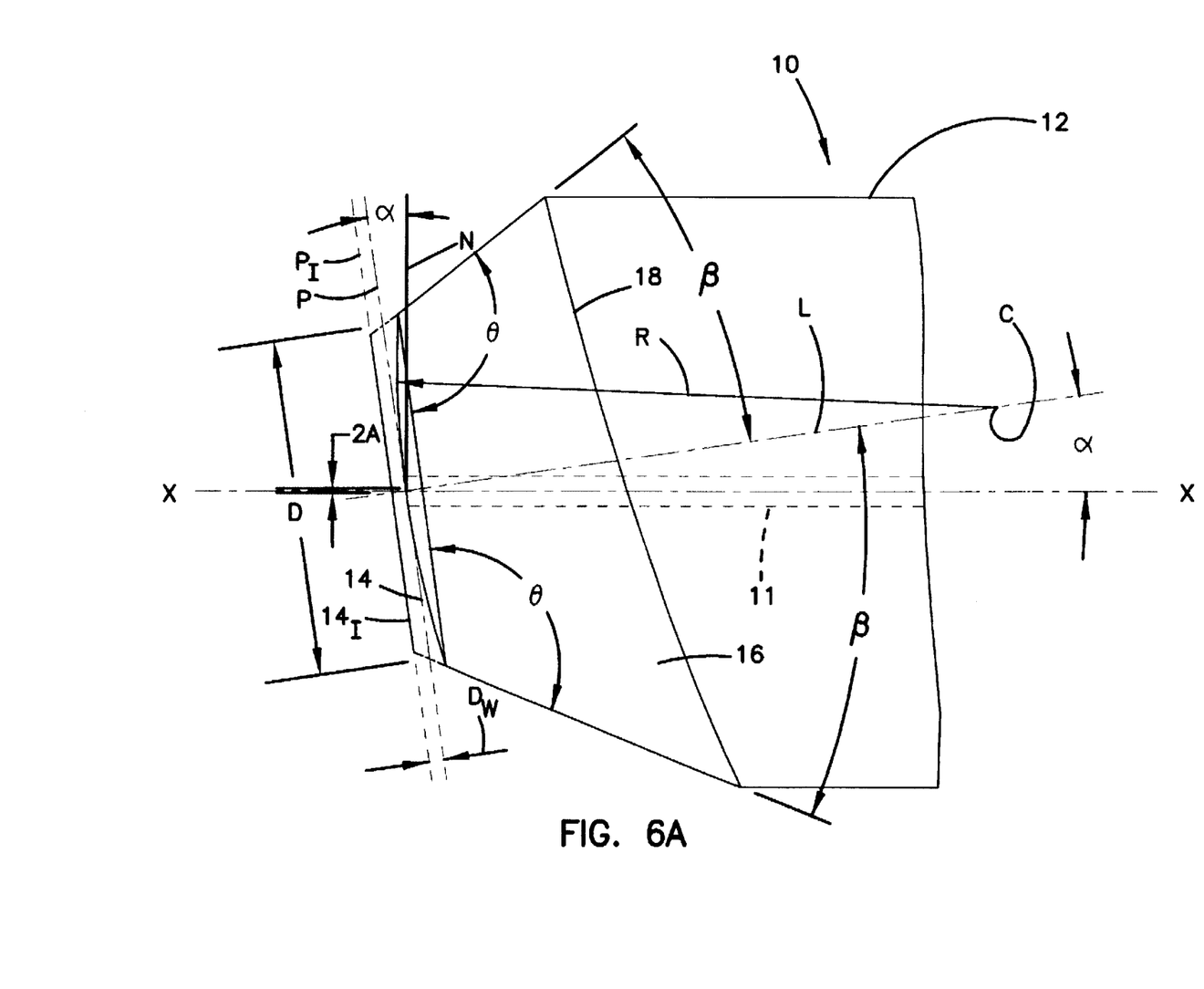
FIG. 6A is a view similar to FIG. 6 showing waste material in phantom lines to illustrate the method of the present invention.
Figures 7, 8:
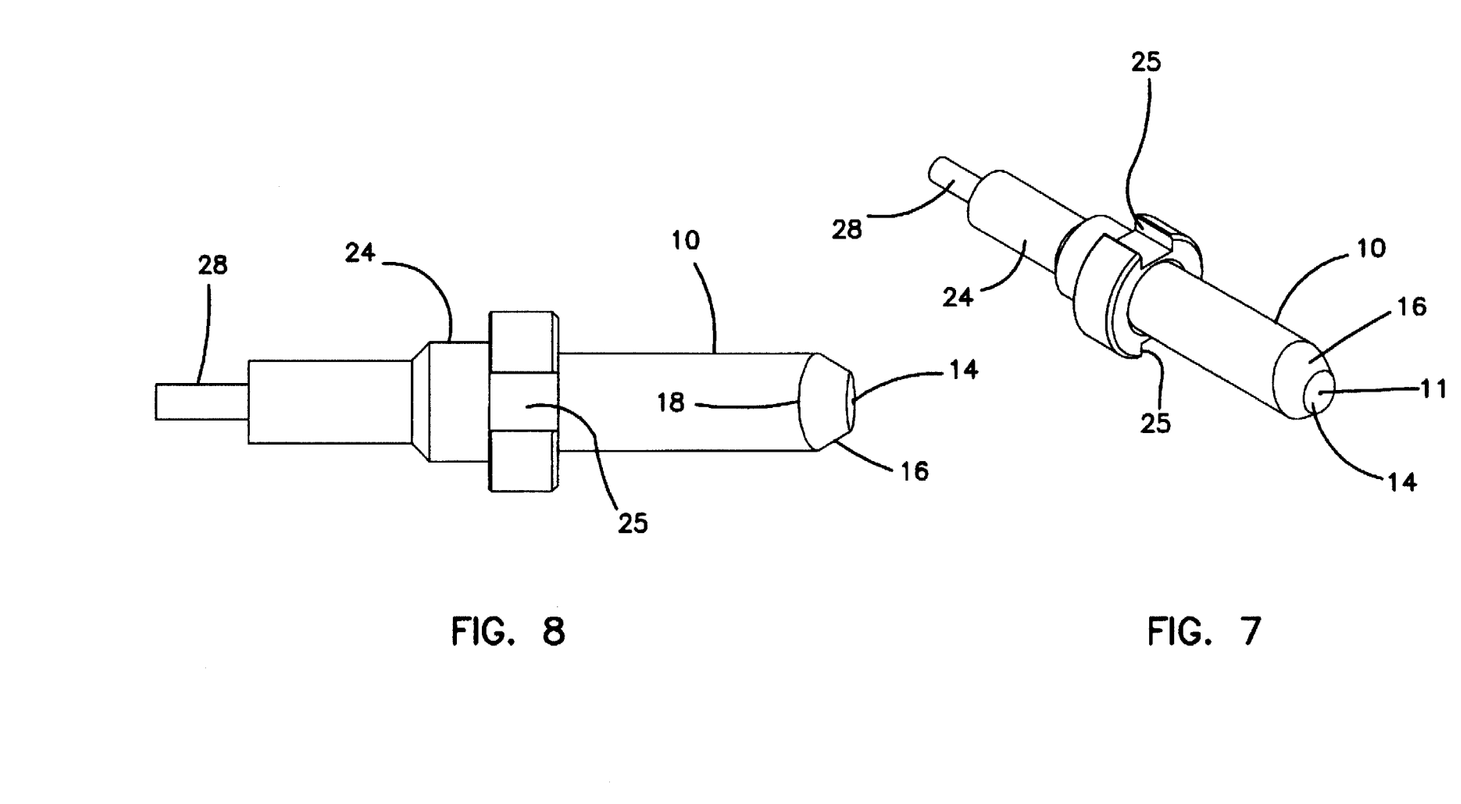
FIG. 7 is a perspective view of a ferrule and hub according to the present invention.
FIG. 8 is a side elevation view of the ferrule and hub of FIG. 7.
Figure 9:
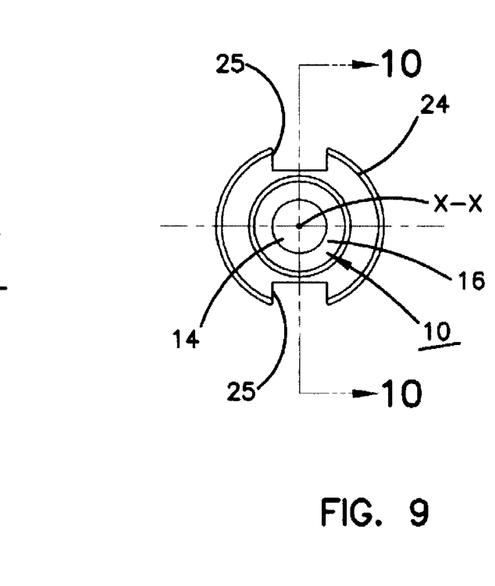
FIG. 9 is an end elevation view of the ferrule and hub of FIG. 8.
Figure 10:
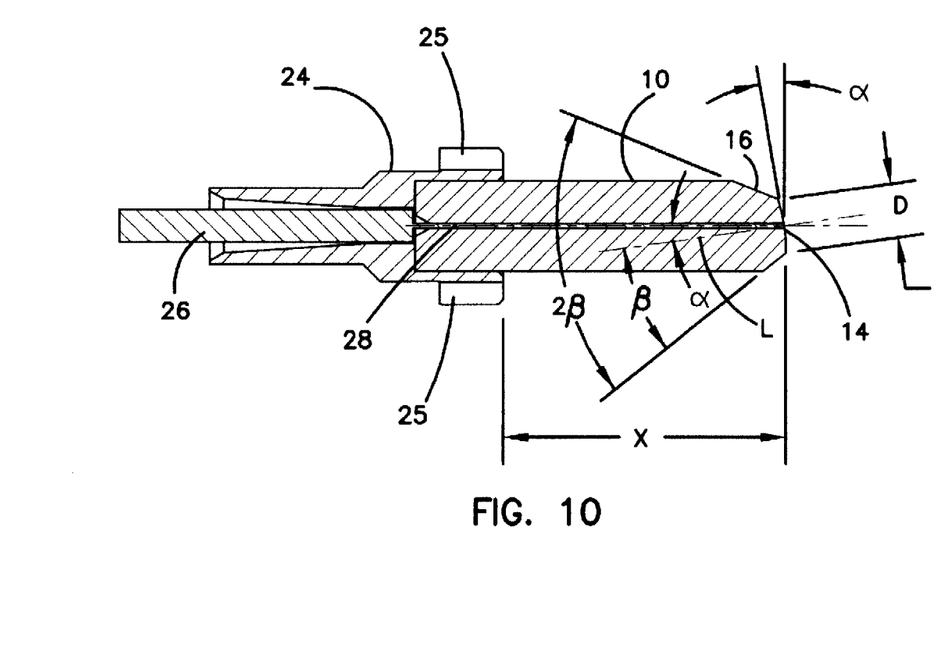
FIG. 10 is a view taken along line 10—10 of FIG. 9.

With reference now to FIGS. 6-12 and more particularly to FIGS. 6 and 6A, a ferrule 10 according to the present invention is shown. The ferrule 10 includes a cylindrical ceramic body 12 having a longitudinal axis X—X through which a centrally positioned bore 11 axially extends. In the embodiment of FIG. 6, the ferrule 10 terminates at a convex and spherical terminal end 14 which is separated from the body 12 by a frusto-conical transition portion 16. The terminal end 14 defines an inclined plane P which is set at an angle of inclination α with respect to a plane N which is perpendicular to the longitudinal axis X—X.

Unlike the embodiments of FIGS. 1–5, the transition portion 16 is not symmetrical about axis X—X. Instead, the transition portion is symmetrical about a line L which extends at an angle α with respect to the longitudinal axis X—X. As a result, the cross-sectional area of the transition area 16 is a circle when taken along a plane (i.e., the plane of inclination, P) which is perpendicular to line L. Further, the line L extends through the ferrule axis X—X at the apex. Also, the contact angle θ is the same value throughout the perimeter of the terminal end 14. Therefore, the apex of the spherical area is formed to be positioned on the axis X—X to minimize insertion loss.

The sequence of the method of formation of the novel ferrule 10 is illustrated in FIG. 6A and includes starting with a cylindrical ferrule body 12 and grinding the transition area 16 to be symmetrical about a center line L which is at an angle α with respect to the longitudinal axis X—X. The cone 16 can have an internal angle β of about 30° (or any other angle, e.g. 45° or other angle).

Following the formation of the transition area 16, an initial inclined plane $P_I$ is ground at the terminal end such that the terminal end is a flat plane $14_f$ perpendicular to the line L. Recognizing that the final polishing to apply the spherical shape to the terminal end 14 will result in removal of material from the terminal end $14_f$, the flat end face $14_f$ is ground such that the line L passes through the center of the end face $14_f$ at a point spaced from the longitudinal axis X—X by an offset, A (in FIG. 6A twice the offset, or 2A, is shown illustrating the offset can occur on either side of the axis X—X). The offset A is calculated as follows: $A=D_w \tan(\alpha)$ where $D_w$ is the anticipated depth of removal of waste during final polishing of end 14. The anticipated depth of removal is a function of the polishing medium, polishing force, and time of polishing and the determination of the depth is well within the skill of the art.

Terminal end 14 is polished to be a segment of a sphere of radius R (about 8 millimeters) having a center C on line L. As previously mentioned, due to the nature of polishing technique, end 14 is not a true sphere but is approximated by a sphere in region of the apex of end 14 which is on line L and X—X (which intersects line L at end 14).

It will be noted that the polishing of the spherical shape assures that the apex moves towards the axis X—X since the circular surface and constant contact angle θ of the flat terminal end $14_f$ insures that tangent forces on the surface $14_f$ during final polishing are equal throughout the end face $14_f$. The circular end face is achieved by providing the transition area 16 at an angle such that the transition area 16 is symmetrical about the line L which is at an angle α with respect to the longitudinal axis X—X rather than the transition portion 16 being symmetrical with the longitudinal axis X—X as was the case with the prior art. As a result, any flat terminal end $14_f$ which is ground at a plane of inclination, P, perpendicular to line L, will always result in a cross-sectional area which is a circle resulting in the desired polishing benefits of a circular area.

Figure 12:
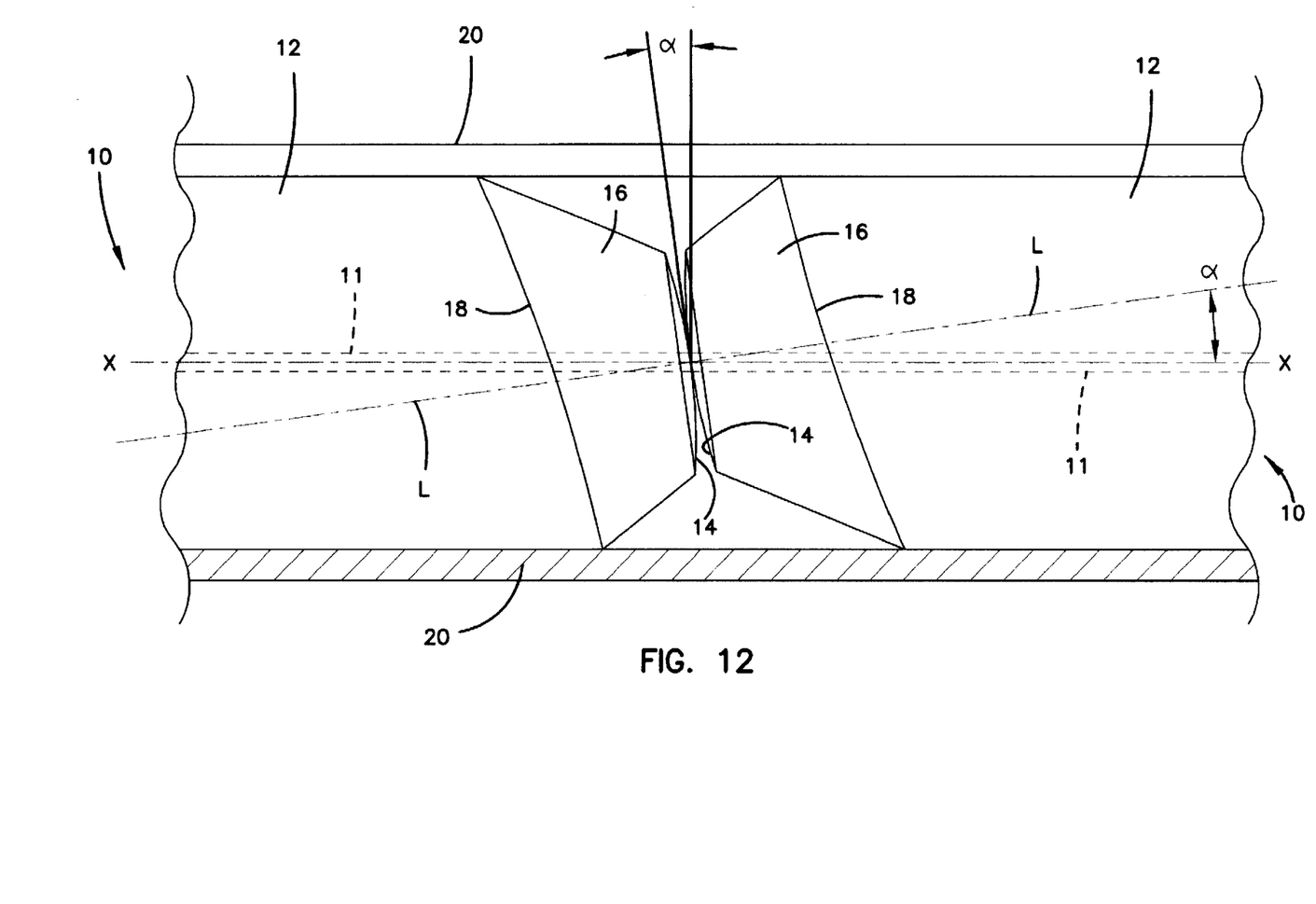
FIG. 12 is a view of opposing ferrules according to the present invention contained within a split sleeve for alignment of the opposing ferrules.

FIG. 12 illustrates two ferrules 10 made according to the present invention and axially aligned within a split sleeve 20 to connect two fibers in bores 11. The apex of each ferrule 10 is opposing and aligned with the apex of the other ferrule 10 to minimize insertion loss. Further, back reflection is minimized through the APC geometry.

Figure 11:
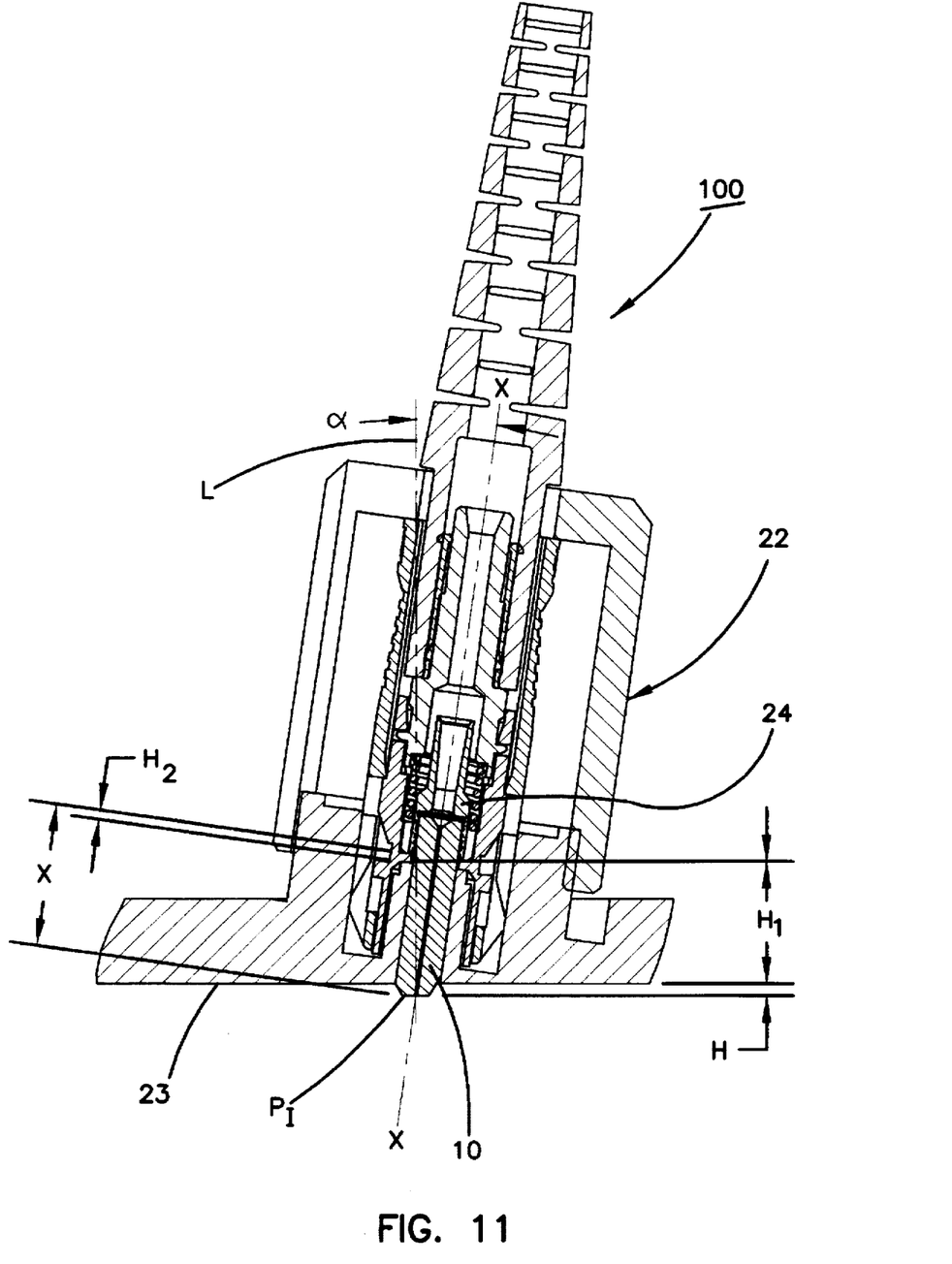
FIG. 11 is a view of a connector containing a ferrule of the present invention in a polishing jig.

FIG. 11 shows a jig 22 for final polishing of a ferrule 10 in a hub 24. A ferrule 10 assembled with a hub 24 and a fiber cable 26 with a fiber 28 are shown in FIGS. 7–10. In FIG. 11, the ferrule 10 and hub 24 are shown in a well-known connector design 100. The jig 22 has a polishing plane or surface 23. The opposing ferrules 10 (FIG. 12) are held in an alignment with the ferrules 10 rotated 180° relative to one another. To insure this alignment, the hubs 24 are provided with keyways 25 to receive keys (not shown) on connectors 100.

A depth of polish, H, is controlled by limited axial movement of ferrule 10 in jig 22. The jig 22 holds ferrule 10 with its axis X—X at angle α with respect to plane 23.

With the design thus described, the polished ferrule tip geometries are more tolerable to the polishing machine fixture 22. For example, where there are tolerances on the dimensions of $H_1$ (polishing jig 22 height), $H_2$ (connector housing space) and X (ferrule length) in FIG. 11, totaling 100 microns, the apex offset would be 14 microns (equal to 100 times the tangent of 8°) resulting in extremely uniform ferrule tip geometries and consistent very low insertion loss and reflectance.

Figure 13:
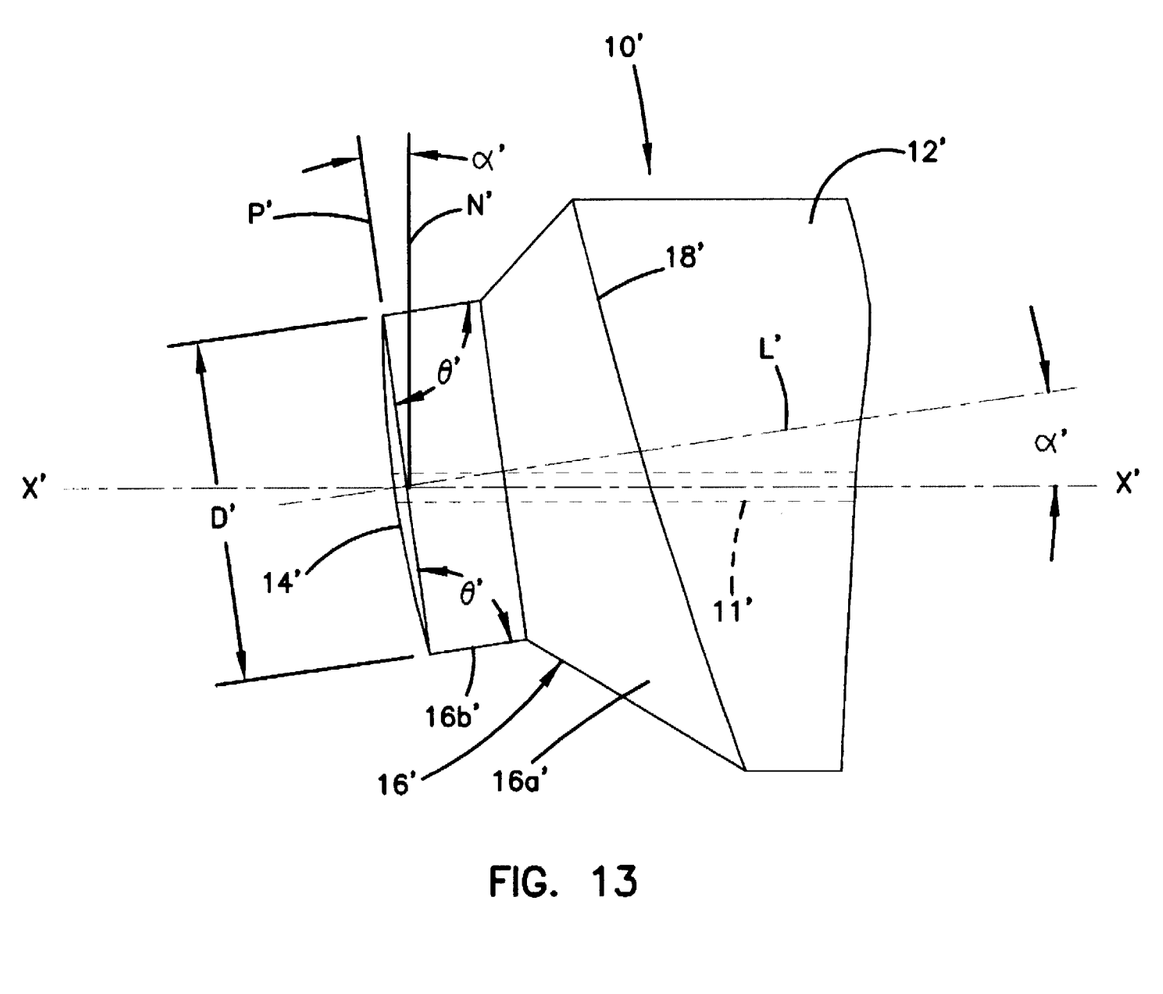
FIG. 13 is a view similar to FIG. 6 showing a first alternative embodiment of the present invention.
Figure 14:
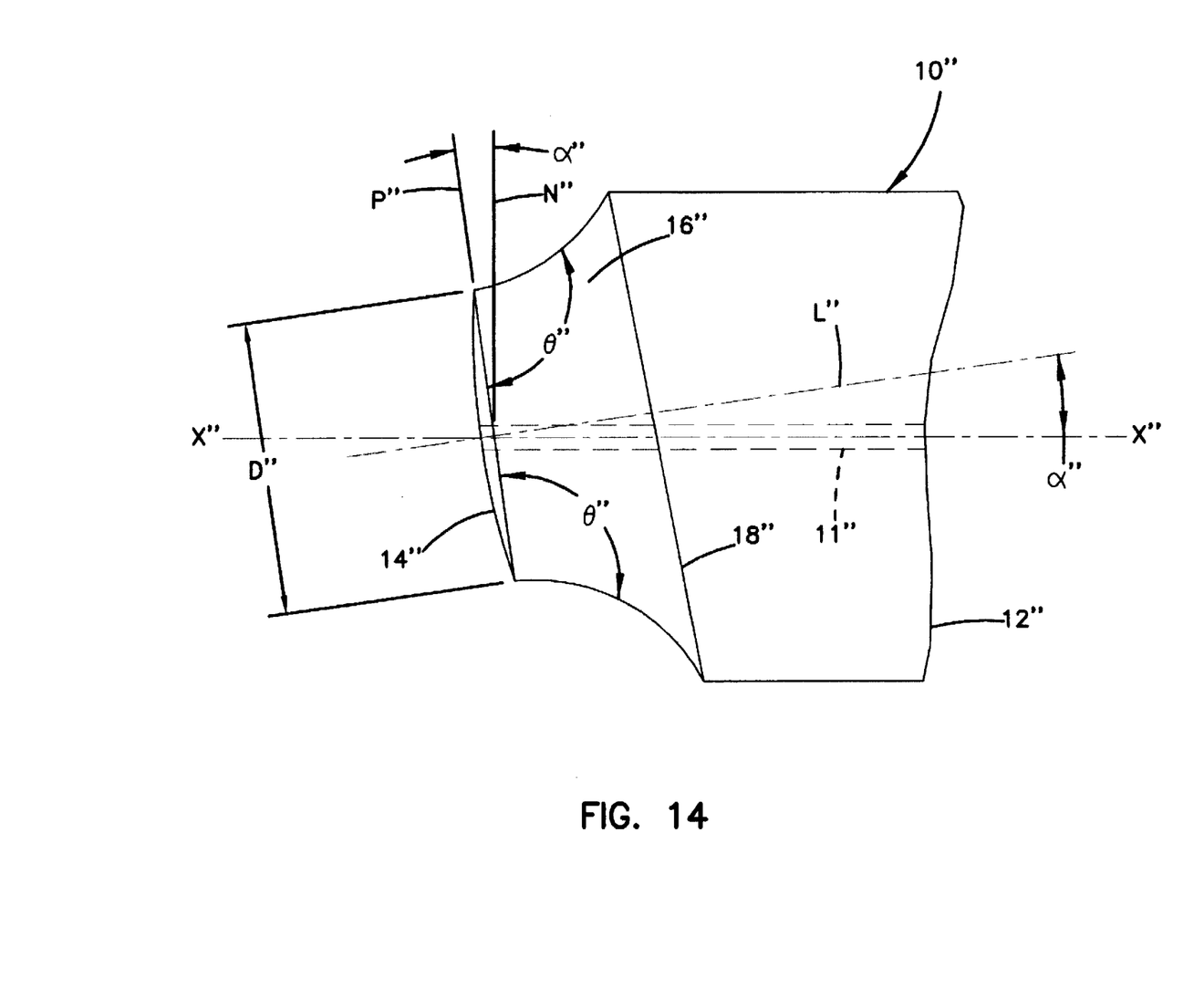
FIG. 14 is the view of FIG. 13 showing a second alternative embodiment.
Figure 15:
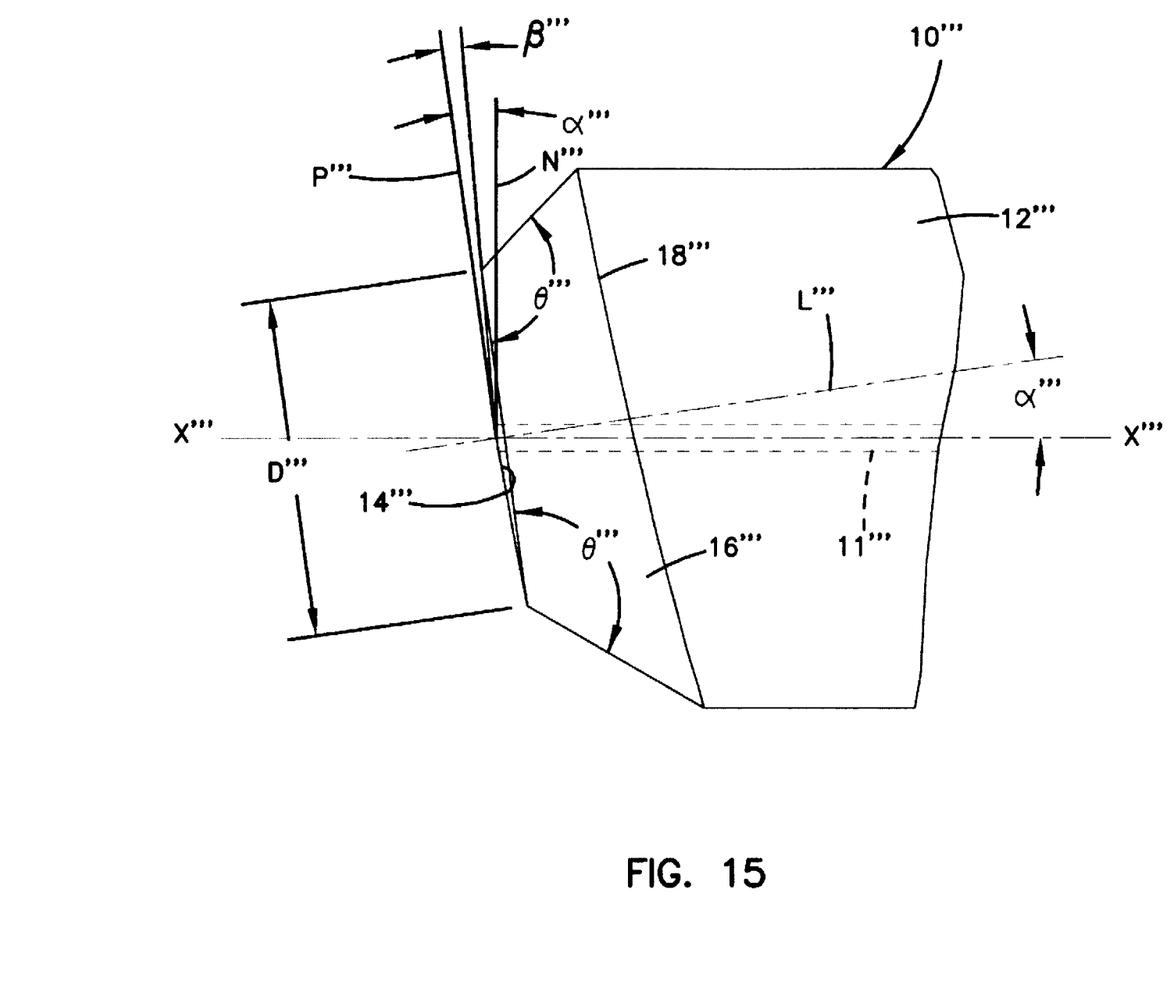
FIG. 15 is the view of FIG. 14 showing a third alternative embodiment.

It will be appreciated that the transition area 16 need not be frusto-conical in shape as shown in FIG. 6. Instead, the transition area 16 could be any surface resulting from revolving a surface defining line segment (which can be a straight or curved line) around a line L which is set at an angle α with respect to the longitudinal axis and where α equals the desired angle of inclination of the end face. Example of such are shown in FIGS. 13–15 in which elements similar to those of FIG. 6 are numbered similarly with the addition of apostrophes to distinguish the embodiments. (Also, the line need not be at an angle to line L but could be parallel to line L to define a cylindrical transition portion.)

In FIG. 13, a ferrule 10' includes a transition portion 16' having a conical portion 16a' and a cylindrical portion 16b'. Portions 16a' and 16b' are symmetrical about line L' at inclination angle α' to axis X'—X'. Line L' intersects axis $X^1$—$X^1$ at the apex of surface $14^1$. One benefit of the embodiment of FIG. 13 over FIG. 6 is that the diameter D' of the end face 14' is constant regardless of the positioning of the inclination plane P' on portion 16b' resulting in more uniform tip geometry. In FIG. 6, the diameter D varies with the placement of plane P.

In FIG. 14, the invention is illustrated with a concave transition portion 16" symmetrical about line L". While the diameter D" varies with placement of plane P", a given difference in placement has a smaller impact on diameter D" than with the embodiment shown in FIG. 6.

In FIG. 15, the end face 14'" is provided with a 2° conical grinding β'" (instead of a flat grind) before the final spherical polish. Comparing FIG. 15 with FIG. 5, it will be noted that line L'" is on the center of surface 14'" unlike FIG. 5 due to the novel geometry of transition portion 16'". As a result, the apex of surface 14'" is centered on axis X'"—X'" after the final spherical polish.

In addition to the foregoing benefits, the perimeter lines 18, 18', 18" and 18'" are at non-perpendicular angles with respect to axes X—X, X'—X', X"—X" and X'"—X'". This results in lower insertion forces when inserting the ferrules 10, 10', 10" and 10'" into a split sleeve 20. Lower insertion forces lead to longer life, less wear and less debris.

From the foregoing detailed description of the present invention, it has been shown how the objects of the invention have been attained in a preferred manner. However, modifications and equivalents of the disclosed concepts such as those which readily occur to one skilled in the art are intended to be included within the scope of the claims which are appended hereto. With the present invention, APC connectors 10 with very low reflectance (<−75 dB) and very low insertion loss (<0.1 dB) and with excellent reliability (±0.01 dB) have been formed and tested at 1300 nm wavelength. Apex of all end faces were less than 25 μm offset and most were less than 10 μm offset with angular errors for 8° at ±0.05° with a spherical polish of 7.5 to 8 mm.

I claim:

1. An optical connector ferrule comprising:
   a ferrule body having a terminal end and a fiber receiving bore with a fiber axis, said bore extending through said terminal end;
   said body including a transition portion adjacent said terminal end;
   an inclined convex end face at said terminal end with said end face defining a plane of inclination inclined relative to said bore axis at an angle;
   said transition portion having an outer surface shaped for said transition portion to have a circular cross-section taken perpendicular to a center line extending orthogonal to said plane of inclination at any one of a plurality of points along said center line and with said center line and said fiber axis defining an angle greater than 0°.

2. An optical connector ferrule according to claim 1 wherein said end face has an apex at said fiber axis.

3. An optical connector ferrule according to claim 1 wherein said transition portion center line and said fiber axis are aligned to substantially intersect at said end face.

4. An optical connector ferrule according to claim 1 wherein said center line extends through a center point of said end face.

5. An optical connector ferrule according to claim 3 wherein said center line passes through said terminal end at an apex of said terminal end.

6. An optical connector ferrule according to claim 4 wherein said center point is coincident with said fiber axis and an apex of said terminal end.

7. An optical connector ferrule comprising:
   a ferrule body having a terminal end and having a fiber receiving bore with a bore axis, said bore extending through said terminal end;
   said body including a transition portion adjacent said terminal end;
   said transition portion having an outer surface shaped for said transition portion to have a circular cross-section taken perpendicular to a center line extending at an angle to said bore axis at any one of a plurality of points along said center line and with said center line and said fiber axis defining an angle greater than 0°.

8. An optical connector ferrule according to claim 7 further comprising an end face at said terminal end with said end face defining a plane of inclination inclined relative to said bore axis at said first angle.

9. An optical connector ferrule according to claim 7 wherein said outer surface is a surface defined by revolving a surface defining line about said center line.

10. An optical connector ferrule according to claim 9 wherein said surface defining line is a straight line and said outer surface is a frustrum of a cone.

11. An optical connector ferrule according to claim 9 wherein said surface defining line is a curved line.

12. An optical connector ferrule according to claim 10 wherein said surface defining line is parallel to said center line.

13. An optical connector ferrule according to claim 8 wherein said end face is convex.

14. An optical connector ferrule according to claim 13 wherein said end face has an apex at said bore axis.

15. A method of forming an optical connector ferrule comprising:
   forming a ferrule body having a terminal end and having a fiber receiving bore with a bore axis, said bore extending through said terminal end, and with an inclined end face at said terminal end with said end face defining a plane of inclination inclined relative to said bore axis at an angle, and with a transition portion having an outer surface shaped for said transition portion to have a circular cross-section taken perpendicular to a transition portion center line extending orthogonal to said plane of inclination at any one of a plurality of points along said center line and with said center line and said fiber axis defining an angle greater than 0°;
   polishing said end face to present a convex surface.

16. A method according to claim 15 comprising:
   said polishing including polishing said end face for an apex of said end face to reside at said bore.

17. A method according to claim 15 comprising:
   said shaping of said end face and said transition portion selected for an apex of said end face to be displaced from said bore by a distance approximate to an anticipated migration of said apex toward said bore during said polishing.

18. An optical connector ferrule comprising:
   a ferrule body having a terminal end and a fiber receiving bore with a bore axis, said bore extending through said terminal end;
   said body including a transition portion adjacent said terminal end;
   said transition portion having an outer surface shaped for said transition portion and a remainder of said ferrule body to intersect at a plane of intersection which is non-perpendicular to said bore axis;
   said transition portion having a substantially constant contact angle throughout a periphery of said transition portion.

* * * * *